United States Patent
Ezaki

(10) Patent No.: US 9,491,800 B2
(45) Date of Patent: Nov. 8, 2016

(54) RADIO COMMUNICATIONS SYSTEM, RADIO BASE STATION APPARATUS, AND METHOD FOR CONTROLLING RADIO COMMUNICATIONS SYSTEM

(71) Applicant: FUJITSU LIMITED, Kawasaki-shi, Kanagawa (JP)

(72) Inventor: Takato Ezaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 14/672,274

(22) Filed: Mar. 30, 2015

(65) Prior Publication Data

US 2015/0282151 A1 Oct. 1, 2015

(30) Foreign Application Priority Data

Mar. 31, 2014 (JP) ................................. 2014-072167

(51) Int. Cl.
| | |
|---|---|
| H04W 72/04 | (2009.01) |
| H04W 88/08 | (2009.01) |
| H04L 5/00 | (2006.01) |
| H04W 28/08 | (2009.01) |
| H04W 72/00 | (2009.01) |
| H04W 72/02 | (2009.01) |
| H04W 72/12 | (2009.01) |

(52) U.S. Cl.
CPC ............ *H04W 88/08* (2013.01); *H04L 5/0053* (2013.01); *H04W 28/08* (2013.01); *H04W 72/00* (2013.01); *H04W 72/02* (2013.01); *H04W 72/12* (2013.01)

(58) Field of Classification Search
CPC ...... H04L 1/18; H04W 72/042; H04W 72/00
See application file for complete search history.

(56) References Cited

U.S. PATENT DOCUMENTS

| | | | | |
|---|---|---|---|---|
| 2011/0255494 | A1 | 10/2011 | Okubo et al. | |
| 2011/0287798 | A1* | 11/2011 | Ono | H04B 7/024 455/509 |
| 2012/0113941 | A1* | 5/2012 | Chung | H04W 72/1289 370/329 |
| 2013/0003604 | A1* | 1/2013 | Blankenship | H04L 5/0053 370/255 |

(Continued)

FOREIGN PATENT DOCUMENTS

JP 2010-114781 5/2010

OTHER PUBLICATIONS

3GPP TS 36.213 v8.8.0, "3rd Generation Partnership Project; Technical Specification Group Access Network; Evolved Universal Terrestrial Radio Access (E-UTRA); Physical Layer procedures", TS 36.213:V8.8.0 (Sep. 2009).

*Primary Examiner* — Khaled Kassim
*Assistant Examiner* — Syed S Ali
(74) *Attorney, Agent, or Firm* — Fujitsu Patent Center

(57) ABSTRACT

A base station apparatus includes an area setting module that sets a part of an area of resources used for communication with a radio communication terminal devices as a search area, a plurality of selecting modules that each select a resource included in the search area and belonging to a group allocated to the scheduler of each of the selecting modules out of groups divided based on logical positions of resources, and an L1 function module that transmits a signal including control information by using the resource selected. The radio communication terminal device includes an acquiring module that receives the signal and searches the search area in the received signal to acquire control information addressed to the radio communication terminal device, and a communication module that communicates with the radio base station based on the control information acquired.

5 Claims, 12 Drawing Sheets

(56) References Cited

U.S. PATENT DOCUMENTS

| | | | |
|---|---|---|---|
| 2013/0003663 A1* | 1/2013 | Blankenship | H04L 5/0053 370/329 |
| 2013/0242906 A1* | 9/2013 | Li | H04L 5/0053 370/329 |
| 2015/0029989 A1* | 1/2015 | Shiizaki | H04L 5/0035 370/329 |
| 2015/0249974 A1* | 9/2015 | Lee | H04W 72/042 370/329 |
| 2015/0304994 A1* | 10/2015 | Kim | H04L 5/0048 370/280 |
| 2016/0044600 A1* | 2/2016 | Kim | H04W 52/04 455/127.1 |
| 2016/0112921 A1* | 4/2016 | Nagasaka | H04W 36/22 370/331 |
| 2016/0113050 A1* | 4/2016 | Li | H04W 52/0209 370/329 |
| 2016/0150485 A1* | 5/2016 | Yi | H04W 52/365 370/311 |

* cited by examiner

| AGGREGATION LEVEL | NUMBER OF CCE RESOURCES OF SEARCH TARGET | NUMBER OF SEARCH SPACES OF SEARCH TARGET |
|---|---|---|
| 1 | 6 | 6 |
| 2 | 12 | 6 |
| 4 | 8 | 2 |
| 8 | 16 | 2 |

FIG.5

| CCE INDEX VALUE | USAGE STATUS OF SCHEDULER 123 | USAGE STATUS OF SCHEDULER 124 |
|---|---|---|
| 0 | 0 | 1 |
| 1 | 0 | 1 |
| 2 | 0 | 1 |
| 3 | 0 | 1 |
| 4 | 1 | 0 |
| 5 | 1 | 0 |
| 6 | 1 | 0 |
| 7 | 1 | 0 |
| 8 | 0 | 1 |
| 9 | 0 | 1 |
| 10 | 0 | 1 |
| 11 | 0 | 1 |
| 12 | 1 | 0 |
| 13 | 1 | 0 |
| 14 | 1 | 0 |
| 15 | 1 | 0 |
| 16 | 0 | 1 |
| 17 | 0 | 1 |
| 18 | 0 | 1 |
| 19 | 0 | 1 |
| 20 | 1 | 0 |
| 21 | 1 | 0 |
| 22 | 1 | 0 |
| 23 | 1 | 0 |
| 24 | 0 | 1 |
| 25 | 0 | 1 |
| 26 | 0 | 1 |
| 27 | 0 | 1 |
| 28 | 1 | 0 |
| 29 | 1 | 0 |
| 30 | 1 | 0 |
| 31 | 1 | 0 |

RADIO COMMUNICATIONS SYSTEM, RADIO BASE STATION APPARATUS, AND METHOD FOR CONTROLLING RADIO COMMUNICATIONS SYSTEM

CROSS-REFERENCE TO RELATED APPLICATION

This application is based upon and claims the benefit of priority of the prior Japanese Patent Application No. 2014-072167, filed on Mar. 31, 2014, the entire contents of which are incorporated herein by reference.

FIELD

The embodiments discussed herein are directed to radio communications systems, radio base station apparatuses, and methods for controlling a radio communications system.

BACKGROUND

In a baseband module of a radio base station apparatus, for reasons of achieving a redundant configuration and a load distribution configuration to improve reliability, there are cases in which a plurality of functional modules having the same function operate independently with respect to a single cell.

Among these functional modules, a radio scheduling module is a functional module that appropriately distributes resources in a cell to users. Consequently, when there are a plurality of radio scheduling modules available for a single cell, it is preferable that radio resources in the cell be divided and allocated to each radio scheduling module such that no competition of resources occurs even when the respective radio scheduling modules concurrently operate.

In many cases, radio resources are managed by being divided in a frequency direction and in a time direction. For example, it is conceivable that, by allocating radio resources to two radio scheduling modules by time division or frequency division, the radio scheduling modules can operate independently. In particular, the allocation of resources by frequency division, as compared with that by time division, has merits such as small delay, and less restriction for resource allocation.

Meanwhile, a physical downlink control channel (PDCCH), which is a downlink control channel in Long Term Evolution (LTE), is allocated with the logical aggregation of resources referred to as a control channel element (CCE). The resource used for the transmission of the PDCCH is expressed by two parameters, namely the physical number of resources in the CCE referred to as an aggregation level and an index that indicates the position of the resource provided for each aggregation level.

The allocation of resources to user equipment (UE) in the PDCCH is limited by a search area that is calculated by a pseudorandom number for each sub-frame with an index value for identifying the UE within the cell uniquely set for each UE as a seed. The index value for identifying the UE within the cell is referred to as cell radio network temporary identification (C-RNTI), for example.

As a conventional method for determining the amount of resources (for example, the number of CCEs) for a PDCCH allocated to the UE, a method has been developed for determining the aggregation level indicative of how many CCEs in a row are to be allocated to the PDCCH on the basis of a channel quality indicator (CQI) notified from the UE.

Patent Document 1: Japanese Laid-open Patent Publication No. 2010-114781

Non-patent Document 1: 3GPP, TS36.213, "Evolved Universal Terrestrial Radio Access (E-UTRA); Physical Layer Procedures".

The range of PDCCH resources usable by the UE is determined at random by a pseudorandom number for each sub-frame, and a radio scheduling module selects a PDCCH resource (one or more CCEs) to allocate for the UE out of them. Consequently, when UEs are divided into two groups, it is difficult for two radio scheduling modules to independently allocate resources such that no collision will occur between them. As in the foregoing, it has been difficult for the two radio scheduling modules, which perform the allocation of a PDCCH resource, to operate independently of each other.

Furthermore, as in the foregoing, it is conceivable that the division of resources by frequency division is, as compared with the division of resources by time division, advantageous in terms of delay, and flexibility in a ratio of resource division. However, it is difficult to divide the PDCCH, for which the usable radio resources for each UE are determined by a pseudorandom number, into a plurality of areas.

SUMMARY

According to an aspect of an embodiment, a radio communications system includes: a radio base station; and a plurality of radio communication terminal devices, the radio base station comprising: an area setting module that sets a part of an area of resources used for communication with the radio communication terminal devices as a search area, a plurality of schedulers that each select a resource included in the search area and belonging to a group allocated to each of the schedulers out of groups that are divided based on logical positions of resources, and a transmitting module that transmits a signal including control information by using the resource selected by each of the schedulers, the radio communication terminal devices each comprising: an acquiring module that receives the signal, searches the search area in the received signal, and acquires control information addressed to the corresponding radio communication terminal device, and a communication module that performs communication with the radio base station based on the control information acquired by the acquiring module.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a table illustrating one example of a usage status table;

DESCRIPTION OF EMBODIMENTS

Preferred embodiments of the present invention will be explained with reference to accompanying drawings. The embodiments discussed herein, however, are not intended to limit the radio communications system, the radio base station apparatus, and the method for controlling a radio communications system disclosed in the application.

[a] First Embodiment

Figure 1:
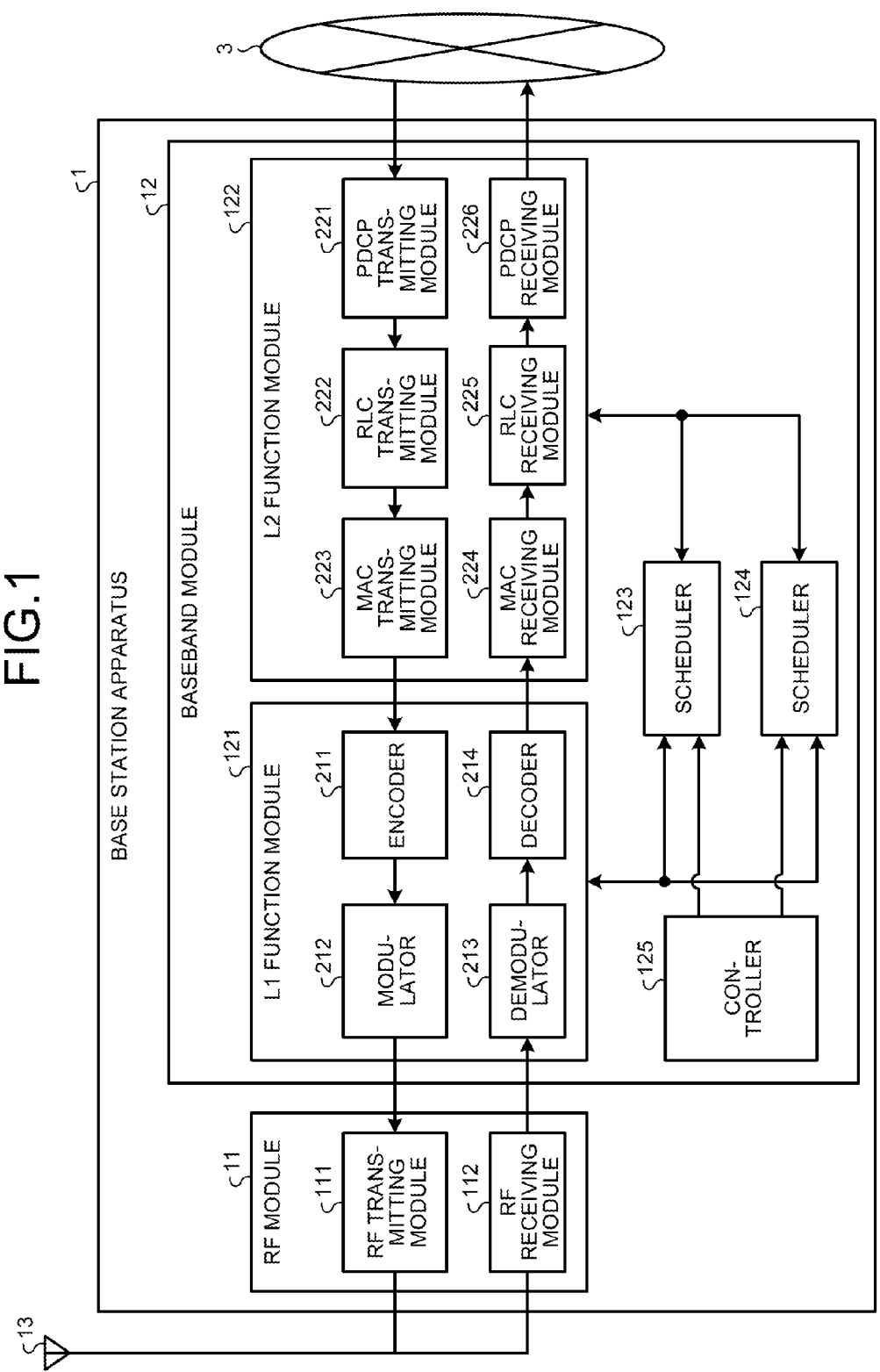
FIG. 1 is a block diagram of a base station apparatus according to a first embodiment.

FIG. 1 is a block diagram of a base station apparatus according to a first embodiment. This base station apparatus 1 in the first embodiment includes a radio frequency (RF) module 11, a baseband module 12, and an antenna 13.

The RF module 11 performs interconversion between a radio signal that is a signal of a high-frequency band and a baseband signal of a low frequency and performs processing on the radio signal. The RF module 11 includes an RF transmitting module 111 and an RF receiving module 112.

The RF transmitting module 111 performs given transmission radio processing, for example, processing of digital-to-analog conversion, up-conversion, and signal amplification, on a signal received from a later-described modulator 212 so as to form a radio signal, and transmits the formed radio signal to a radio communication terminal device via the antenna 13. The radio communication terminal device is also referred to as user equipment (UE).

The RF receiving module 112 performs given reception radio processing, for example, processing of down-conversion and analog-to-digital conversion, on a reception signal received via the antenna 13, and outputs the reception signal after the reception radio processing to a later-described demodulator 213.

The baseband module 12 performs processing on a baseband signal received from the RF module 11. In detail, the baseband module 12 includes an L1 function module 121, an L2 function module 122, a scheduler 123, a scheduler 124, and a controller 125.

The L1 function module 121 receives results of radio scheduling including a PDCCH from the scheduler 123 or 124. For example, the L1 function module 121 receives a notification of an allocation resource that is a PDCCH resource to allocate the PDCCH from the scheduler 123 or 124. The L1 function module 121 then performs processing in the physical layer on the baseband signal.

More specifically, the L1 function module 121 includes an encoder 211, the modulator 212, the demodulator 213, and a decoder 214.

The encoder 211 receives input of a transmission signal from a media access control (MAC) transmitting module 223. The encoder 211 performs an encoding process on the received transmission signal in accordance with the radio scheduling received from the schedulers 123 and 124. Specifically, the encoder 211 performs encoding on the physical downlink shared channel (PDSCH) of the entire cell and on the PDCCH that includes a downlink control signal and an uplink transmission instruction signal. The encoder 211 then outputs the transmission signal after the encoding process to the modulator 212.

The modulator 212 receives input of a transmission signal from the encoder 211. The modulator 212 modulates the transmission signal including the PDSCH and the PDCCH in accordance with the radio scheduling received from the scheduler 123 or 124. The modulator 212 further performs an inverse fast Fourier transformation process on the transmission signal after the modulation in accordance with the radio scheduling received from the scheduler 123 or 124. The modulator 212 then outputs, to the RF transmitting module 111, the transmission signal on which the inverse fast Fourier transformation process has been performed.

The demodulator 213 receives input of the reception signal from the RF receiving module 112. The demodulator 213 performs a fast Fourier transformation process on the received reception signal. Furthermore, the demodulator 213 demodulates the reception signal on which the fast Fourier transformation process has been performed. The demodulator 213 then outputs the reception signal after the demodulation to the decoder 214.

The decoder 214 receives input of the reception signal from the demodulator 213. The decoder 214 decodes the received reception signal. The decoder 214 then outputs the reception signal after the decoding to an MAC receiving module 224.

The L2 function module 122 performs processing in the data link layer on the baseband signal. The L2 function module 122 includes a packet data convergence protocol (PDCP) transmitting module 221, a radio link control (RLC) transmitting module 222, the MAC transmitting module 223, the MAC receiving module 224, an RLC receiving module 225, and a PDCP receiving module 226.

The PDCP transmitting module 221 receives input of the transmission signal from a line 3. The PDCP transmitting module 221 performs header compression processing and secrecy processing on the transmission signal. The PDCP transmitting module 221 then outputs the transmission signal that has been processed to the RLC transmitting module 222.

The RLC transmitting module 222 receives input of the transmission signal from the PDCP transmitting module 221. The RLC transmitting module 222 performs the processes of dividing and combining the transmission signal in accordance with the instructions given from the MAC transmitting module 223. The RLC transmitting module 222 further performs an automatic repeat request (ARQ) process (retransmission process). The RLC transmitting module 222 then outputs the transmission signal that has been processed to the MAC transmitting module 223.

The MAC transmitting module 223 receives input of the transmission signal from the RLC transmitting module 222.

The MAC transmitting module 223 composes the transmission signal received from the RLC transmitting module 222. For example, the MAC transmitting module 223 performs the addition of an MAC header. Furthermore, the MAC transmitting module 223 receives scheduling of the transmission signal from the scheduler 123 or 124. The MAC transmitting module 223 then performs scheduling of each transmission signal, that is, allocation to radio resources, in accordance with the acquired information on the scheduling. The MAC transmitting module 223 further performs a hybrid automatic repeat request (HARQ) process. The MAC transmitting module 223 then outputs the transmission signal that has been processed to the encoder 211.

The MAC receiving module 224 receives scheduling of signal reception from the scheduler 123 or 124. The MAC receiving module 224 then receives input of the reception signal from the decoder 214 in accordance with the scheduling. The MAC receiving module 224 then reconstructs the reception signal. For example, the MAC receiving module 224 performs the removal of the MAC header. The MAC receiving module 224 then outputs the reception signal that has been processed to the RLC receiving module 225.

The RLC receiving module 225 receives input of the reception signal from the MAC receiving module 224. The RLC receiving module 225 performs the division and integration of the reception signal. The RLC receiving module 225 further performs correction of the order of the reception signal. The RLC receiving module 225 then outputs the reception signal to the PDCP receiving module 226 in the corrected order.

The PDCP receiving module 226 receives input of the reception signal from the RLC receiving module 225. The PDCP receiving module 226 performs security check on the reception signal and decompression of the header. The PDCP receiving module 226 then transmits the reception signal to a radio communication terminal device of destination via the line 3.

Figure 2:
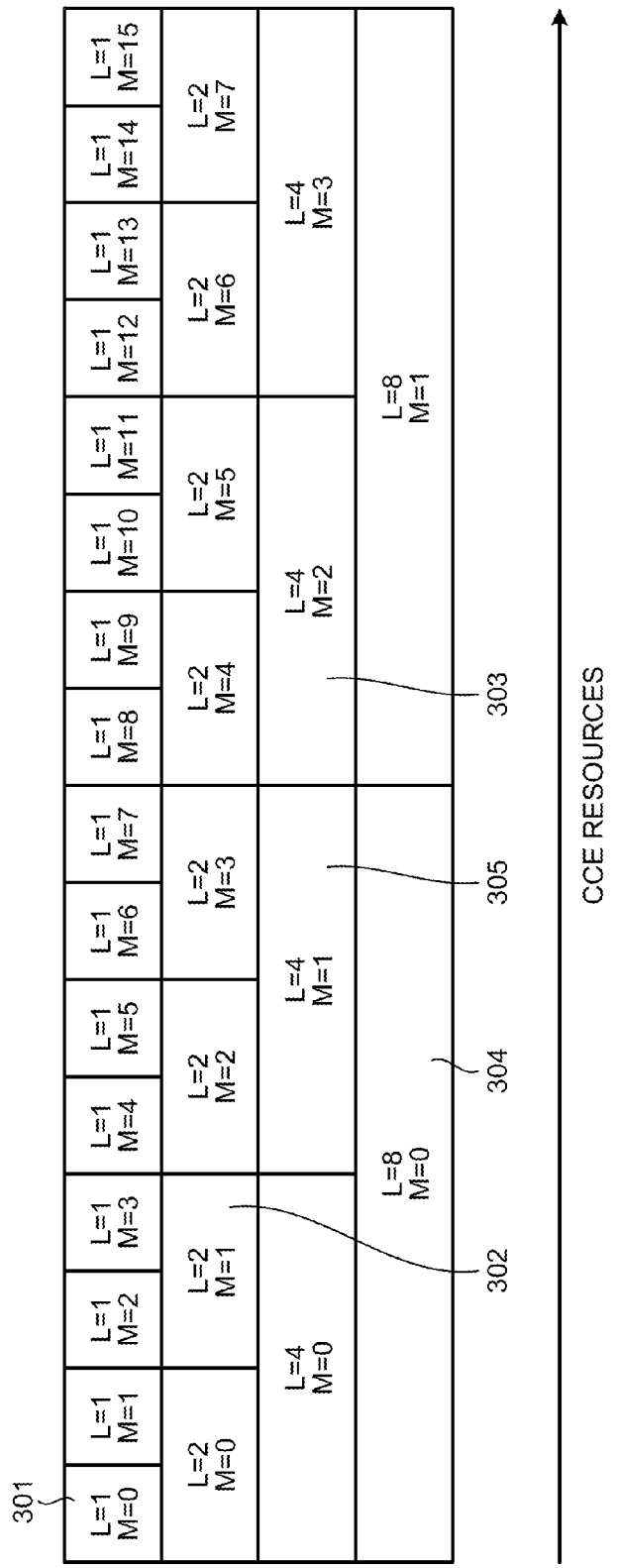
FIG. 2 is a diagram for explaining PDCCH resources for each aggregation level.

The controller 125 stores therein groups produced by dividing PDCCH resources. Now, the PDCCH resources will be described. FIG. 2 is a diagram for explaining PDCCH resources for each aggregation level.

The PDCCH is allocated to the logical aggregation of radio resources referred to as a CCE. That is, the radio resource used for the transmission of the PDCCH is the radio resource produced by combining one or more CCEs, with a single CCE as a unit resource. In the following description, the resource used for the transmission of the PDCCH is referred to as a "PDCCH resource". The unit resource that corresponds to a single CCE is referred to as a "CCE resource". Furthermore, the whole of PDCCH resources that can be the targets of transmitting the PDCCH in given communication are referred to as a "PDCCH resource group". The number assigned by the size of a CCE resource in a sequence from the top of the PDCCH resource group is referred to as a "CCE index value".

The abscissa axis in FIG. 2 represents the sequence by the order of CCE resource, that is, the order of CCE index value.

Each PDCCH resource is represented by L and M indicated in FIG. 2. That is, the one surrounded by a frame and assigned with the values of L and M in FIG. 2 corresponds to a single PDCCH resource.

The L here is a value referred to as an aggregation level, and represents the physical number of CCE resources that are included in the PDCCH resource thereof. The aggregation level can also be regarded as the number of combined CCE resources in the PDCCH resource. For example, if L=1, it is a PDCCH resource that includes a single CCE resource. That is, the PDCCH resource of L=1 corresponds to a CCE resource. If L=2, it is a PDCCH resource that includes two CCE resources.

The M is a value referred to as a resource index, and represents the index value of a PDCCH resource in a PDCCH resource group at a given aggregation level. The resource index can also be regarded as representing a logical position of the PDCCH resource in the PDCCH resource group.

In FIG. 2, the PDCCH resources are displayed in the order of the resource index values to simply represent a logical image. Actual PDCCH resources, however, are not physically arranged as in FIG. 2. Specifically, for the PDCCH resources, the frequencies on a line drawn downward in the vertical direction in FIG. 2 are the same. However, there is a circumstance that the frequencies of the PDCCH resources arranged side by side are not continuous. That is, the resource index is simply a value representing a logical position.

For example, in a PDCCH resource 301, the aggregation level (L) is one and the resource index (M) is zero. That is, the PDCCH resource 301 is the same size as a single CCE resource and is the top resource in the logical position at the aggregation level of one.

In a PDCCH resource 302, the aggregation level (L) is two and the resource index (M) is one, for example. That is, the PDCCH resource 302 has the size of two CCE resources combined and is the second resource in the logical position at the aggregation level of two.

In a PDCCH resource 303, the aggregation level (L) is four and the resource index (M) is two, for example. That is, the PDCCH resource 303 has the size of four CCE resources combined and is the third resource in the logical position at the aggregation level of four.

In a PDCCH resource 304, the aggregation level (L) is eight and the resource index (M) is zero, for example. That is, the PDCCH resource 304 has the size of eight CCE resources combined and is the top resource in the logical position at the aggregation level of eight.

The controller 125 stores therein groupings of PDCCH resources divided into a group of PDCCH resources for which the aggregation level (L) is four and the resource index (M) is zero or an even number, and a group of PDCCH resources for which the aggregation level (L) is four and the resource index (M) is an odd number. These groups are used when the PDCCH resources are divided. In the following description, the PDCCH resource to be a reference for creating the groups, that is, the PDCCH resource for which the aggregation level (L) is four in this case is referred to as a "division reference PDCCH resource".

Of the division reference PDCCH resources with the aggregation level (L) of four, the group of division reference PDCCH resources with the resource indices (M) of zero or even numbers is referred to as an "even number group". Of the division reference PDCCH resources with the aggregation level (L) of four, the group of division reference PDCCH resources with the resource indices (M) of odd numbers is referred to as an "odd number group".

The controller 125 notifies the schedulers 123 and 124 of information representing that the use of PDCCH resources corresponding to which group of division reference PDCCH resources is permitted out of the groups of division reference PDCCH resources. In the following description, the PDCCH resources corresponding to the group of division reference PDCCH resources that the controller 125 permitted the schedulers 123 and 124 to use are referred to as "use-permitted resources".

In the first embodiment, the controller 125 notifies the scheduler 123 of the PDCCH resources corresponding to the even number group as the use-permitted resources. The controller 125 notifies the scheduler 124 of the PDCCH resources corresponding to the odd number group as the use-permitted resources.

The schedulers 123 and 124 receive a notification of use-permitted resources from the controller 125. The schedulers 123 and 124 further receive information on a radio communication terminal device of destination from the L1 function module 121.

The schedulers 123 and 124 each store therein the group of radio communication terminal devices the scheduling of which is handled by the corresponding scheduler. That is, the radio communication terminal devices present in the cell of the base station apparatus 1 are divided into two groups, and the scheduler 123 handles one of the groups and the scheduler 124 handles the other.

The scheduler that handles the radio communication terminal device of destination out of the schedulers 123 and 124 then selects a PDCCH resource to allocate the PDCCH from the PDCCH resource group by using the information on use-permitted resource. The scheduler that handles the radio communication terminal device of destination out of the schedulers 123 and 124 then notifies the L1 function module 121 of the selected PDCCH resource as a use resource to be used for the allocation of the PDCCH. In the following description, a PDCCH resource selected and notified to the L1 function module 121 by the scheduler 123 as a PDCCH resource to allocate for the PDCCH is referred to as an "allocation PDCCH resource".

Figures 3, 4:
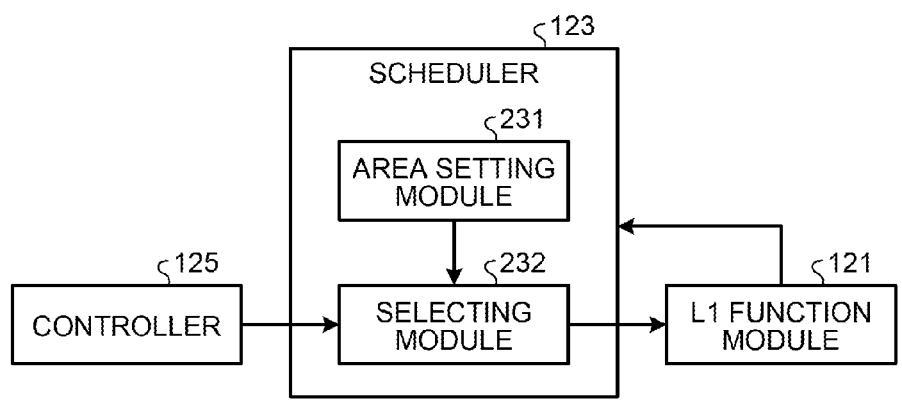
FIG. 3 is a block diagram representing the detail of a scheduler.
FIG. 4 is a table representing the number of search spaces for each aggregation level.

With reference to FIG. 3, the schedulers 123 and 124 will be described in detail. The schedulers 123 and 124 perform the same processing with only the difference in radio communication terminal devices and use-permitted resources to handle. Thus, in the following description, the scheduler 123 is explained as an example. FIG. 3 is a block diagram representing the detail of the scheduler.

The scheduler 123 includes an area setting module 231 and a selecting module 232. The scheduler 123 receives the information on a radio communication terminal device of destination from the L1 function module 121. The scheduler 123 then executes the following processing when the radio communication terminal device of destination is the radio communication terminal device that the scheduler 123 handles.

The area setting module 231 determines the aggregation level of the PDCCH resource used for the transmission of the PDCCH. In the following description, the PDCCH resource used for the transmission of the PDCCH is referred to as a "transmission PDCCH resource". The area setting module 231 then sets a user-specific search area that is an area of PDCCH resources for a radio communication terminal device to search for a PDCCH addressed to the radio communication terminal device.

For example, the area setting module 231 obtains a user-specific search area calculated by a pseudorandom number for each sub-frame with a cell radio network temporary identification (C-RNTI) as a seed that is uniquely set for each radio communication terminal device.

For example, the area setting module 231 obtains a user-specific search area by using an index value defined by the following Expression 1.

$$L \cdot \{(Y_k + m) \bmod \lfloor N_{CCE}/L \rfloor\} + i \quad (1)$$

In Expression 1, the L represents an aggregation level. The m represents a resource index. The m takes an integer value equal to or greater than 0 and equal to or smaller than M(L)−1 in the course of searching for PDCCH candidates in the radio communication terminal device or in the course of searching for a PDCCH resource to allocate in the base station apparatus 1. The M(L) is the number of allocable PDCCH resources (PDCCH candidates) included in a user-specific search area at a given aggregation level L. An individual PDCCH resource included in a user-specific search area $N_{CCE}$ is referred to as a "search space".

The relation between a link aggregation level and the number of search spaces included in a user-specific search area is the relation illustrated in FIG. 4. FIG. 4 is a table representing the number of search spaces for each aggregation level.

As illustrated in FIG. 4, when the aggregation level (L) is one, the number of search spaces included in a user-specific search area is six. When the aggregation level (L) is one, the number of CCE resources included in a single PDCCH resource is one. Thus, when the aggregation level (L) is one, the number of CCE resources included in the user-specific search area is six.

Furthermore, when the aggregation level (L) is two, the number of search spaces included in a user-specific search area is six. When the aggregation level (L) is two, the number of CCE resources included in a single PDCCH resource is two. Thus, when the aggregation level (L) is two, the number of CCE resources included in the user-specific search area is 12.

When the aggregation level (L) is four, the number of search spaces included in a user-specific search area is two. When the aggregation level (L) is four, the number of CCE resources included in a single PDCCH resource is four. Thus, when the aggregation level (L) is four, the number of CCE resources included in the user-specific search area is eight.

When the aggregation level (L) is eight, the number of search spaces included in a user-specific search area is two. When the aggregation level (L) is eight, the number of CCE resources included in a single PDCCH resource is eight. Thus, when the aggregation level (L) is eight, the number of CCE resources included in the user-specific search area is 16.

The explanation of Expression 1 is continued. The $N_{CCE}$ represents the number of CCEs in the k-th sub-frame, that is, the number of resource element groups (REGs) allocable to the PDCCH. A resource element group is composed of a plurality of resource elements. The i represents a CCE index value of the CCE resource included in a single PDCCH resource. The i takes an integer value equal to or greater than 0 and equal to or smaller than L−1 in the course of searching for PDCCH candidates in the radio communication terminal device or in the course of searching for a PDCCH resource to allocate for the PDCCH in the base station apparatus 1. The $Y_k$ is a variable that is an element for defining the starting position (an offset value) of the search area. The $Y_k$ is set to zero in a common search area, and in a user-specific search area, is determined based on a variety of values including an identification value such as a C-RNTI assigned to the user, and a slot number. For example, the $Y_k$ is defined by the following Expression 2.

$$Y_k = (A \cdot Y_{k-1}) \bmod D \quad (2)$$

In Expression 2, the A represents a fixed value of 39827. The D represents a fixed value of 65537. The k that is the index of the variable Y indicates a sub-frame number defined from a slot number in a radio frame. For example, an initial value $Y_1$ of the variable $Y_k$ is an RNTI value, for example, C-RNTI. That is, the value equivalent to the calculation result obtained by performing a recursive MOD calculation for the number of times equivalent to the sub-frame number with the RNTI value as the initial value is the variable $Y_k$.

However, the method of obtaining the index that defines the user-specific search area by the base station apparatus 1 in the first embodiment is not particularly limited.

For example, as in the foregoing, the area setting module 231 may dynamically perform calculations equivalent to Expression 1 and Expression 2. Furthermore, the area setting module 231 may refer to values in a table stored in a storage area (not depicted) such as a memory and acquire a value equivalent to the calculation result. The content of Expression 1 and Expression 2 may be altered in design appropriately in accordance with the revision and the like of the specifications in the 3rd Generation Partnership Project (3GPP).

The setting of user-specific search area by the area setting module 231 will be described with an example in which the aggregation level of transmission PDCCH resources is four.

The area setting module 231 determines that the aggregation level of transmission PDCCH resources is four. The area setting module 231 then sets a user-specific search area by using Expression 1, for example. In this case, the number of search spaces included in the user-specific search area is two. Consequently, for example, the area setting module 231 defines the resource index of the top search space in the user-specific search area as one, and sets the search spaces up to the search space for which the resource index is two and which is the one search space following the top search space, as the user-specific search area. That is, the area setting module 231 sets a PDCCH resources 305 and the PDCCH resources 303 in FIG. 2 as the user-specific search area.

The area setting module 231 then notifies the selecting module 232 of the information on the set user-specific search area. The area setting module 231 performs the notification of the information on the user-specific search area by using the first CCE index value of the top transmission PDCCH resource in the user-specific search area, for example.

The selecting module 232 creates a usage status table 250 that represents the usage status of transmission PDCCH resources illustrated in FIG. 5 each time a slot number in radio frame format is updated. FIG. 5 is a table illustrating one example of the usage status table. Note that, although FIG. 5 represents both the usage status of the scheduler 123 and the usage status of the scheduler 124, the schedulers 123 and 124 may each have a table to manage only the usage status of their own. The schedulers 123 and 124 may each have the same usage status table 250, or may each refer to a single usage status table 250 stored in an external storage area.

The whole PDCCH resources in the usage status table 250 corresponds to a PDCCH resource group. In the usage status table 250 in FIG. 5, the PDCCH resource group has a size of an aggregate of 31 CCE resources. The usage status table 250 represents the usage status of PDCCH resources by assigning CCE indices to CCE resources from the top in the unit of CCE resource and storing a value indicative of the usage status of a corresponding resource for each index. In the fields in the usage status table 250 indicating the usage status of the scheduler 123 or the usage status of the scheduler 124, "0" represents an unused resource and "1" represents a used resource.

The selecting module 232 generates the usage status table 250 in which all of the fields are marked as unused. Subsequently, the selecting module 232 receives a notification that defines the transmission PDCCH resources corresponding to the even number group as use-permitted resources from the controller 125. The selecting module 232 then marks, as used, the PDCCH resources other than the use-permitted resources in the usage status table 250. The usage status table 250 in FIG. 5 represents the state in which the notification has been received from the controller 125 and the resources other than the use-permitted resources have been marked as used. As in the foregoing, the usage status table 250 sets the information indicative of used resources to the transmission PDCCH resources that are not permitted to use so as to mask them, such that only the use-permitted resources for each scheduler are available as the transmission PDCCH resources.

For example, in FIG. 5, for the scheduler 123, the fields for the CCE index values of 4 to 7, 12 to 15, 20 to 23, and 28 to 31 are masked as the transmission PDCCH resources not permitted to use.

Furthermore, the selecting module 232 also stores the value representing a used resource for the allocation PDCCH resources that have already been used for the allocation of the PDCCH in the usage status table 250.

The selecting module 232 receives a user-specific search area from the area setting module 231. The selecting module 232 then selects, as an allocation PDCCH resource, one transmission PDCCH resource from the transmission PDCCH resources for which none of the CCE resources included therein are marked as used, out of the transmission PDCCH resources in the usage status table 250.

This process will be described with reference to the usage status table 250 in FIG. 5. In this case, it is assumed that the aggregation level of transmission PDCCH resources is four.

The selecting module 232 acquires, from the area setting module 231, the information indicating that the CCE index value of the PDCCH resources is "4", as the information indicative of a user-specific search area. The selecting module 232 identifies the user-specific search area corresponding to the CCE index value. In this case, the selecting module 232 defines the transmission PDCCH resources corresponding to the CCE index values of 4 to 11 as the user-specific search area.

The selecting module 232 then refers to the usage status table 250, and from the top of the user-specific search area, searches for the allocable transmission PDCCH resources for which the aggregation level is four. In FIG. 5, because the fields for the CCE index values of 4 to 7 are marked as used and masked, the selecting module 232 determines the resources corresponding to the fields not to be the subjects of allocation. The selecting module 232 then tries to determine whether the subsequent transmission PDCCH resources are unused. Because the fields for the CCE index values of 8 to 11 are marked as unused, the selecting module 232 selects the transmission PDCCH resources corresponding to the fields as the allocation PDCCH resource. Subsequently, the selecting module 232 updates the usage status fields for the CCE index values included in the allocation PDCCH resource, that is, the CCE index values of 8 to 11, in the usage status table 250 with the value representing a used resource.

This process is further described with reference to FIG. 2. The selecting module 232 receives a notification indicating that the PDCCH resources 305 and 303 are the user-specific search area, from the area setting module 231. The selecting module 232 then uses, for the allocation of the PDCCH, the transmission PDCCH resources corresponding to use-permitted resources for which the aggregation level is four and the resource index is zero or an even number, out of the PDCCH resources 305 and 303. The resource index of the PDCCH resource 303 is two, which is an even number. That is, the PDCCH resource 303 is the use-permitted resource for the selecting module 232 of the scheduler 123. Consequently, the selecting module 232 can select the PDCCH resource 303 as the allocation PDCCH resource.

Meanwhile, when the scheduler 124 acquires the information indicating that the CCE index value of the PDCCH resource is "4" as the information indicative of a user-specific search area from the area setting module 231, in the same manner as the scheduler 123, the scheduler 124 refers to the usage status table 250 and searches for the allocable transmission PDCCH resources for which the aggregation level is four, in sequence from the top of the user-specific search area. In FIG. 5, because the fields for the CCE index values of 4 to 7 are marked as unused, the scheduler 124 selects the transmission PDCCH resources corresponding to the fields as the allocation PDCCH resource. Subsequently, the scheduler 124 updates the usage status fields in the usage status table 250 corresponding to the CCE index values included in the allocation PDCCH resource, that is, the CCE index values of 4 to 7, with the value representing a used resource.

The selecting module 232 notifies the L1 function module 121 of the information on the selected allocation PDCCH resource.

Figure 6:
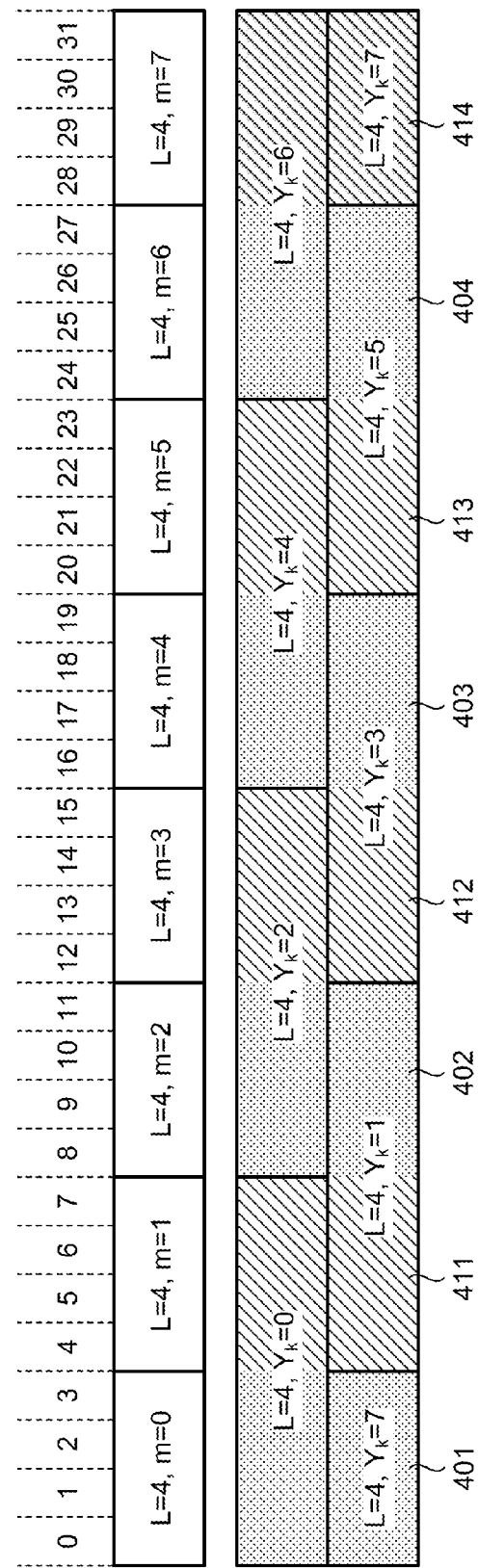
FIG. 6 is a diagram illustrating use-permitted resources when the aggregation level of transmission PDCCH resources is four in the first embodiment.

With reference to FIG. 6, the following describes that the use-permitted resources are equally allocated to any group of radio communication terminal devices when the aggregation level of transmission PDCCH resources is four in the first embodiment. FIG. 6 is a diagram illustrating use-permitted resources when the aggregation level of transmission PDCCH resources is four in the first embodiment.

In FIG. 6, the uppermost row indicates CCE index values. The second row from the top indicates the division reference PDCCH resources of aggregation level four. The lower two rows represent the user-specific search areas to be set when the aggregation level of transmission PDCCH resources is four.

When the division reference PDCCH resources of aggregation level four are divided into the even number group and the odd number group, areas 401 to 404 are the transmission PDCCH resources that belong to the even number group. Furthermore, areas 411 to 414 are the transmission PDCCH resources that belong to the odd number group.

As illustrated in FIG. 6, when the aggregation level of transmission PDCCH resources is four, the transmission PDCCH resources of aggregation level four that belong to the even number group and the odd number group can be selected for any of the user-specific search areas. In any of the user-specific search areas, the ratios of transmission PDCCH resources corresponding to the even number group and the odd number group are the same. That is, when the division reference PDCCH resources of aggregation level four are sorted by the even number and odd number of resource indices, the selecting module 232 can equally allocate the transmission PDCCH resources of aggregation level four to any of the radio communication terminal devices in two groups.

Figure 7:
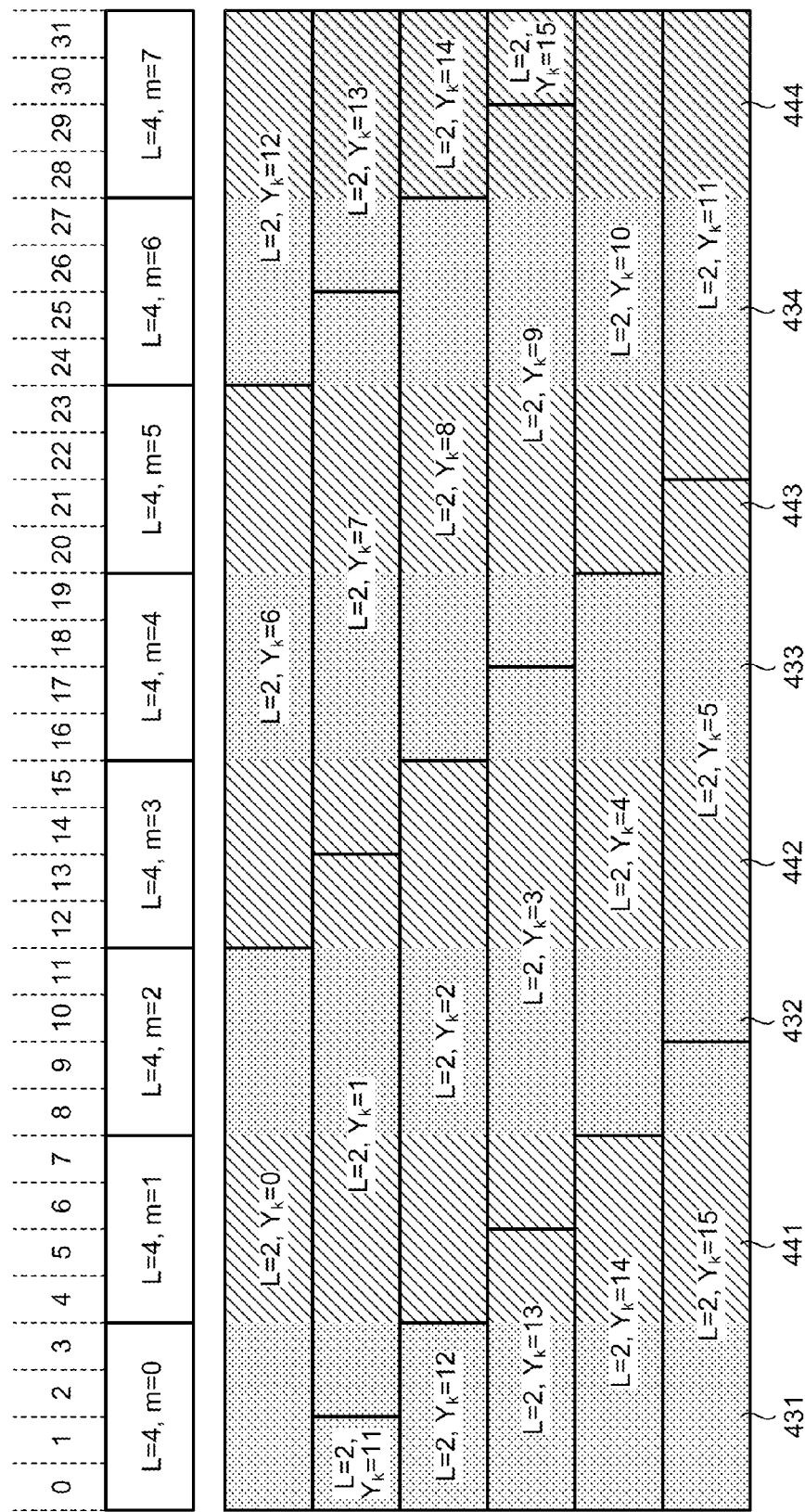
FIG. 7 is a diagram illustrating use-permitted resources when the aggregation level of transmission PDCCH resources is two in the first embodiment.

Furthermore, with reference to FIG. 7, the following describes that the extraction of PDCCH resources usable for the allocation of the PDCCH when the aggregation level of transmission PDCCH resources is two is equally performed on any group of radio communication terminal devices in the first embodiment. FIG. 7 is a diagram illustrating use-permitted resources when the aggregation level of transmission PDCCH resources is two in the first embodiment.

In FIG. 7, the uppermost row indicates CCE index values. The second row from the top indicates division reference PDCCH resources of aggregation level four. The lower six rows represent the user-specific search areas to be set when the aggregation level of transmission PDCCH resources is two.

When the division reference PDCCH resources of aggregation level four are divided into the even number group and the odd number group, areas 431 to 434 are the transmission PDCCH resources that belong to the even number group. Furthermore, areas 441 to 444 are the transmission PDCCH resources that belong to the odd number group.

As illustrated in FIG. 7, when the aggregation level of transmission PDCCH resources is two, in any of the user-specific search areas, two each of the transmission PDCCH resources of aggregation level two that belong to the even number group and the odd number group are included. Consequently, in any of the user-specific search areas, the ratios of transmission PDCCH resources corresponding to the even number group and the odd number group are the same. That is, when the division reference PDCCH resources of aggregation level four are sorted by the even number and odd number of resource indices, the selecting module 232 can equally allocate the transmission PDCCH resources of aggregation level two to any of the radio communication terminal devices in two groups.

Figure 8:
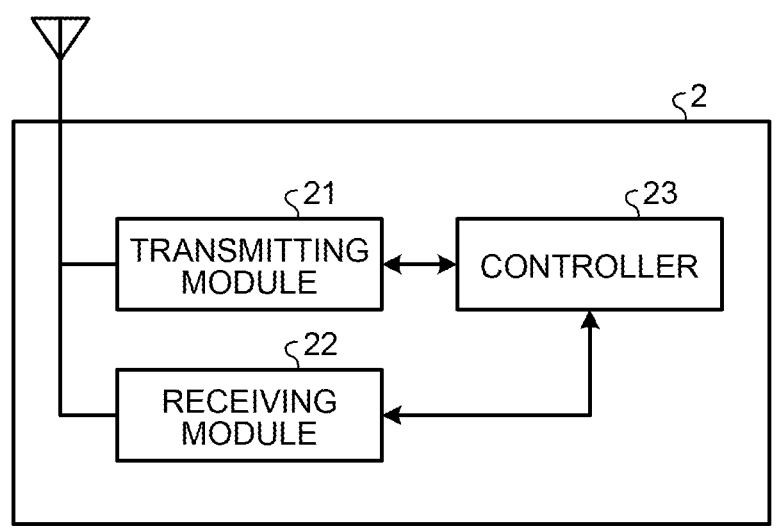
FIG. 8 is a block diagram of a radio communication terminal device.

FIG. 8 is a block diagram of a radio communication terminal device. A radio communication terminal device 2 includes a transmitting module 21, a receiving module 22, and a controller 23.

The receiving module 22 receives a signal. The receiving module 22 then identifies a user-specific search area by using a C-RNTI as a seed that is set to the radio communication terminal device 2. Then, the controller 23 tries to receive all the PDCCHs of search spaces included in the user-specific search area. When a PDCCH addressed to the radio communication terminal device 2 is obtained, the receiving module 22 outputs the received PDCCH to the controller 23.

Subsequently, the receiving module 22, by receiving the control from the controller 23 based on the PDCCH, receives a signal.

The controller 23 receives the PDCCH from the receiving module 22. The controller 23 then acquires control information from the PDCCH. Then, the controller 23 controls the transmitting module 21 and the receiving module 22 in accordance with the acquired control information.

The transmitting module 21 transmits a signal in accordance with the control from the controller 23.

Figure 9:
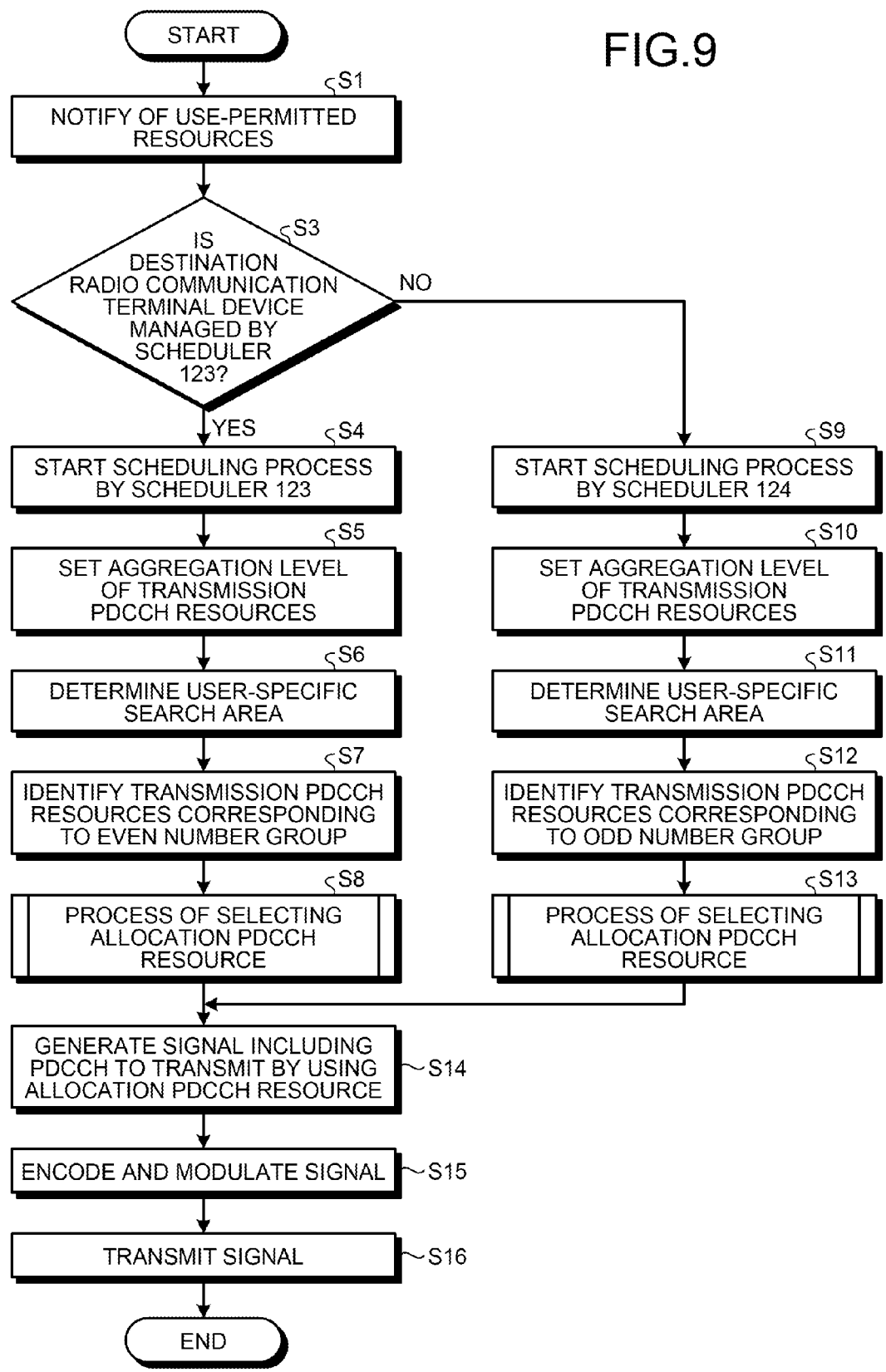
FIG. 9 is a flowchart of a process of transmitting a PDCCH performed by the base station apparatus in the first embodiment.

With reference to FIG. 9, described is a process of transmitting a PDCCH performed by the base station apparatus 1 in the first embodiment. FIG. 9 is a flowchart of the process of transmitting the PDCCH performed by the base station apparatus 1 in the first embodiment.

The controller 125 gives a notification of use-permitted resources to the selecting module 232 of the scheduler 123. Here, the controller 125 defines, as use-permitted resources, the transmission PDCCH resources corresponding to either one of the groups of division reference PDCCH resources of aggregation level four sorted by even numbers or odd numbers of resource indices. The controller 125 further transmits, to the selecting module 232 of the scheduler 124, the notification of use-permitted resources different from those of the scheduler 123 (Step S1). Here, described is a situation in which the controller 125 has notified the selecting module 232 of the scheduler 123 that the transmission PDCCH resources corresponding to the even number group are the use-permitted resources. Furthermore, described is a situation in which the controller 125 has notified the selecting module 232 of the scheduler 124 that the transmission PDCCH resources corresponding to the odd number group are the use-permitted resources.

The schedulers 123 and 124 acquire the information on a radio communication terminal device of destination. The schedulers 123 and 124 determine whether the radio communication terminal device of destination is the radio communication terminal device managed by the scheduler 123 (Step S3).

If the radio communication terminal device is managed by the scheduler 123 (Yes at Step S3), the scheduler 123 starts a scheduling process (Step S4).

The area setting module 231 of the scheduler 123 determines the aggregation level of transmission PDCCH resources (Step S5).

Next, the area setting module 231 of the scheduler 123 sets a user-specific search area by using a C-RNTI as a seed (Step S6).

The selecting module 232 of the scheduler 123 identifies the transmission PDCCH resources corresponding to the even number group in the user-specific search area set by the area setting module 231 (Step S7). The even number group is a group of division reference PDCCH resources for which the aggregation level is four and the resource index is zero or an even number. That is, the selecting module 232 marks, as used, the transmission PDCCH resources corresponding to the division reference PDCCH resources for which the resource index in the usage status table 250 is an odd number.

Next, the selecting module 232 of the scheduler 123 executes a process of selecting an allocation PDCCH resource out of the identified transmission PDCCH resources (Step S8).

Meanwhile, if the radio communication terminal device is managed by the scheduler 124 (No at Step S3), the scheduler 124 starts a scheduling process (Step S9).

The area setting module 231 of the scheduler 124 determines the aggregation level of transmission PDCCH resources (Step S10).

Next, the area setting module 231 of the scheduler 124 sets a user-specific search area by using the C-RNTI as a seed (Step S11).

The selecting module 232 of the scheduler 124 identifies the transmission PDCCH resources corresponding to the odd number group in the user-specific search area set by the area setting module 231 (Step S12). The odd number group is a group of division reference PDCCH resources for which the aggregation level is four and the resource index is an odd number. That is, the selecting module 232 marks, as used, the transmission PDCCH resources corresponding to the division reference PDCCH resources for which the resource index in the usage status table 250 is zero or an even number.

Next, the selecting module 232 of the scheduler 124 executes a process of selecting an allocation PDCCH resource out of the identified transmission PDCCH resources (Step S13).

The L1 function module 121 receives the scheduling result of the PDCCH from the scheduler 123 or 124. The L1 function module 121 then generates a signal including the PDCCH to transmit by using the selected allocation PDCCH resource (Step S14).

Thereafter, the L1 function module 121 encodes and modulates the generated signal (Step S15).

The RF transmitting module 111 then transmits the signal, which is acquired from the L1 function module 121, to the radio communication terminal device via the antenna 13 (Step S16).

Figure 10:
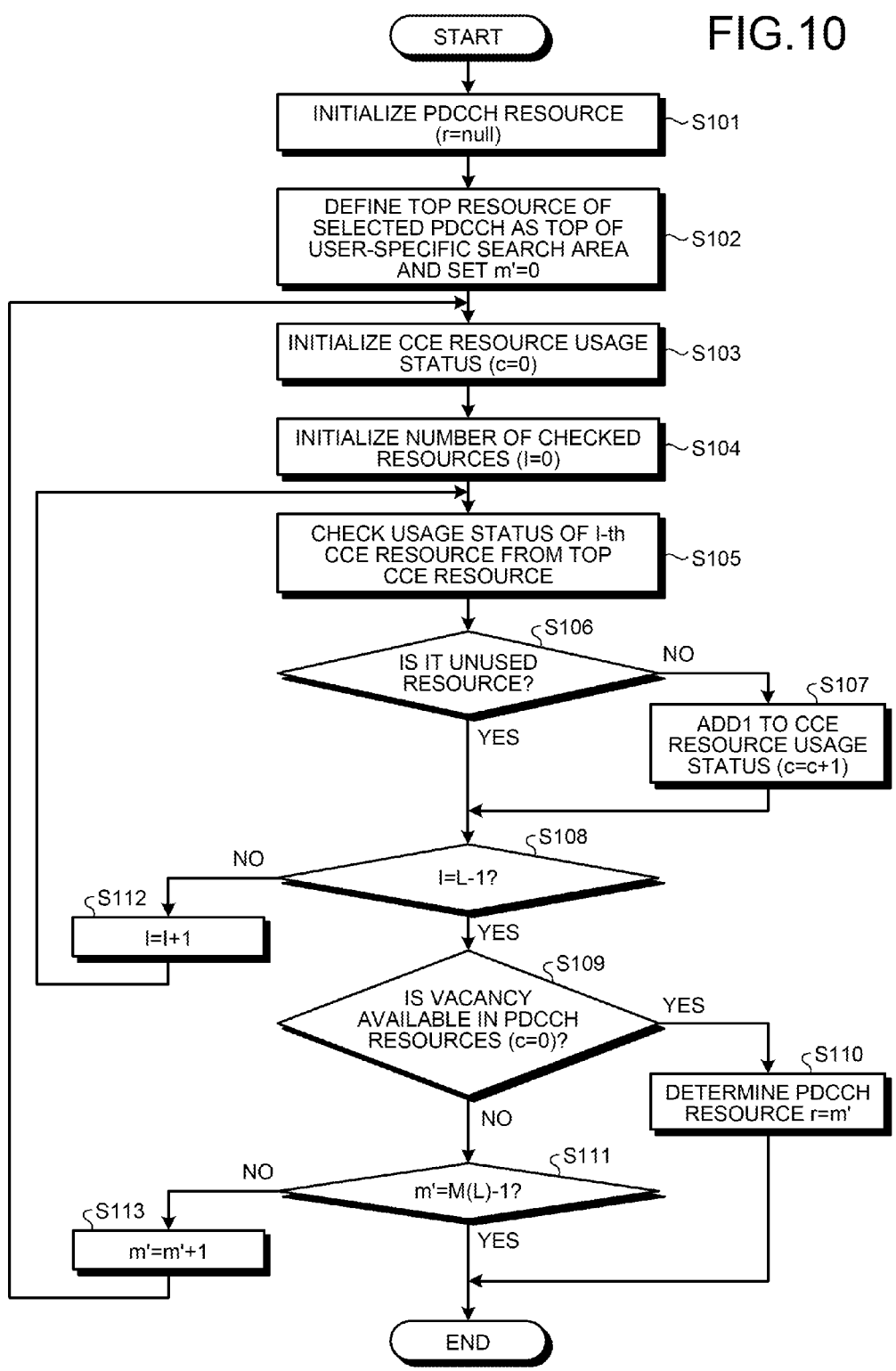
FIG. 10 is a flowchart of a process of selecting a PDCCH resource to be used for the allocation of the PDCCH.

With reference to FIG. 10, described is a process of selecting an allocation PDCCH resource performed by the selecting module 232. FIG. 10 is a flowchart of a process of selecting the PDCCH resource used for the allocation of the PDCCH. The sequence illustrated in FIG. 10 corresponds to an example of the process at Step S8 and Step S13 in FIG. 9.

The selecting module 232 initializes an allocation PDCCH resource (Step S101). In other words, the selecting module 232 sets a state in which no allocation PDCCH resource is selected, that is, r=null. The r is a value that represents a selected allocation PDCCH resource, and is a value of the top resource index of the allocation PDCCH resource.

The selecting module 232 defines the top CCE resource included in a selected allocation PDCCH resource as the top CCE resource in the user-specific search area. Defining the top CCE resource included in the selected allocation PDCCH resource as m', the selecting module 232 sets m'=0 (Step S102).

The selecting module 232 initializes a CCE resource usage status. The CCE resource usage status is the information representing the use or nonuse of CCE resources that are included in the selected allocation PDCCH resource. Defining the CCE resource usage status as "c", the selecting module 232 sets c=0 (Step S103).

The selecting module 232 initializes the number of checked resources. The number of checked resources is the number of checks made on the use or nonuse of CCE resources that are included in the selected allocation PDCCH resource. Defining the number of checked resources as "I", the selecting module 232 sets I=0 (Step S104).

The selecting module 232 checks for the usage status of the I-th CCE resource from the top CCE resource included in the selected allocation PDCCH resource by using the usage status table 250 (Step S105). Here, I-th is the number from the top CCE resource in a state of the transmission PDCCH resources logically arranged as in FIG. 2. The selecting module 232 then determines whether the usage status of the I-th CCE resource from the top CCE resource is marked as unused (Step S106).

If the I-th CCE resource from the top CCE resource is marked as used (No at Step S106), the selecting module 232 adds one to the CCE resource usage status. That is, the selecting module 232 sets c=c+1 (Step S107).

The selecting module 232 then determines whether I=aggregation level (L)−1 holds true (Step S108). If I≠L−1 (No at Step S108), the selecting module 232 sets I=I+1 (Step S112) and the process returns to Step S105.

In contrast, if I=L−1 (Yes at Step S108), the selecting module 232 determines whether there is any vacancy available in the transmission PDCCH resources to be the allocation PDCCH resource, by determining whether c=0 holds true (Step S109).

If there is any vacancy available in the transmission PDCCH resources (Yes at S109), the selecting module 232 determines the allocation PDCCH resource to be r=m'. That is, the selecting module 232 selects, as the allocation PDCCH resource, the transmission PDCCH resource for which the m'-th CCE resource from the top of the user-specific search area is the top CCE resource (Step S110).

In contrast, if there is no vacancy available in the transmission PDCCH resources (No at Step S109), the selecting module 232 determines whether m'=M(L)−1 holds true (Step S111).

If m'≠M(L)−1 (No at Step S111), the selecting module 232 sets m'=m'+1 (Step S113) and the process returns to Step S103.

In contrast, if m'=M(L)−1 (Yes at Step S111), the selecting module 232 gives up the allocation of the PDCCH this time around and ends the process of determining an allocation PDCCH resource.

Figure 11:
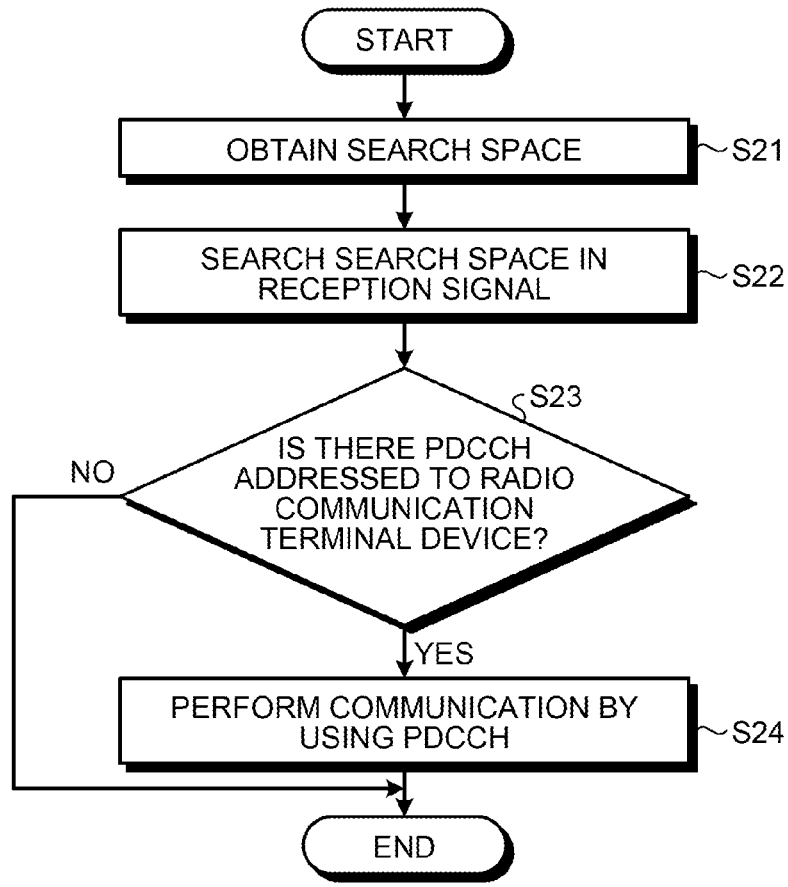
FIG. 11 is a flowchart of communication control performed by the radio communication terminal device.

Furthermore, with reference to FIG. 11, described is the communication control performed by the radio communication terminal device 2. FIG. 11 is a flowchart of the communication control performed by the radio communication terminal device.

The receiving module 22 identifies a user-specific search area by using the C-RNTI as a seed set to the radio communication terminal device 2 and obtains a search space included in the user-specific search area (Step S21).

The receiving module 22 searches for the PDCCH addressed to the radio communication terminal device 2 in the search space obtained from a reception signal (Step S22).

The receiving module 22 determines whether there is a PDCCH addressed to the radio communication terminal device 2 (Step S23). If there is no PDCCH addressed to the radio communication terminal device 2 (No at Step S23), the receiving module 22 ends the communication this time around.

If there is a PDCCH addressed to the radio communication terminal device 2 (Yes at Step S23), the receiving module 22 transmits the PDCCH addressed to the radio communication terminal device 2 to the controller 23. The controller 23 controls the transmitting module 21 and the receiving module 22 in accordance with the control information included in the received PDCCH, and performs communication with the base station apparatus 1 (Step S24).

Figure 12:
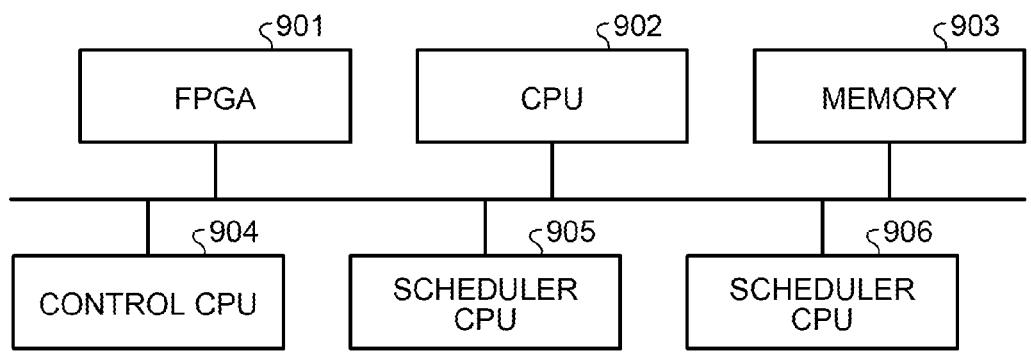
FIG. 12 is a block diagram illustrating the hardware configuration of a baseband module in a base station apparatus.

FIG. 12 is a block diagram illustrating the hardware configuration of a baseband module in a base station apparatus. The baseband module 12 of the base station apparatus 1 includes a field programmable gate array (FPGA) 901, a central processing unit (CPU) 902, a memory 903, a control CPU 904, and scheduler CPUs 905 and 906.

The FPGA 901, the CPU 902, the memory 903, the control CPU 904, and the scheduler CPUs 905 and 906 are coupled to one another via a bus.

The FPGA 901 implements the respective functions of the encoder 211, the modulator 212, the demodulator 213, and the decoder 214 of the L1 function module 121 illustrated in FIG. 1, for example.

The CPU 902 and the memory 903 implement the various functions of the PDCP transmitting module 221, the RLC transmitting module 222, the MAC transmitting module 223, the MAC receiving module 224, the RLC receiving module 225, and the PDCP receiving module 226 of the L2 function module 122 illustrated in FIG. 1, for example.

The control CPU 904 and the memory 903 implement the function of the controller 125 illustrated in FIG. 1.

The scheduler CPU 905 and the memory 903 implement the various functions of the area setting module 231 and the selecting module 232 of the scheduler 123 illustrated in FIG. 3. For example, the memory 903 stores therein the usage status table 250 and others of the scheduler 123.

The scheduler CPU 906 and the memory 903 implement the various functions of the area setting module 231 and the selecting module 232 of the scheduler 124 illustrated in FIG. 1. For example, the memory 903 stores therein the usage status table 250 and others of the scheduler 124.

Furthermore, as for the transmitting module 21, the receiving module 22, and the controller 23 of the radio communication terminal device 2, the various functions thereof are implemented by a CPU and a memory.

As explained in the foregoing, the radio base station apparatus in the first embodiment groups the division reference PDCCH resources of aggregation level four by even numbers and odd numbers of resource indices, and allocates the groups to different schedulers. Each of the schedulers then selects the allocation PDCCH resource out of the transmission PDCCH resources in the user-specific search area corresponding to the division reference PDCCH resources of the allocated group. Thus, because the PDCCH resources can be equally allocated to the radio communication terminal devices that are handled by the respective schedulers, the appropriate division of the schedulers can be performed. Consequently, the reliability and load distribution performance of the base station apparatus can be improved.

While the schedulers 123 and 124 are exemplified to create the usage status table 250 in the above-described explanation, the controller 125 may create the usage status table 250 and transmit it to the schedulers 123 and 124, for example.

Furthermore, when the schedulers 123 and 124 create the usage status table 250, by setting the use-permitted resources in advance to the schedulers 123 and 124, the schedulers 123 and 124 may create the usage status table 250 in accordance with the settings.

[b] Second Embodiment

Figure 13:
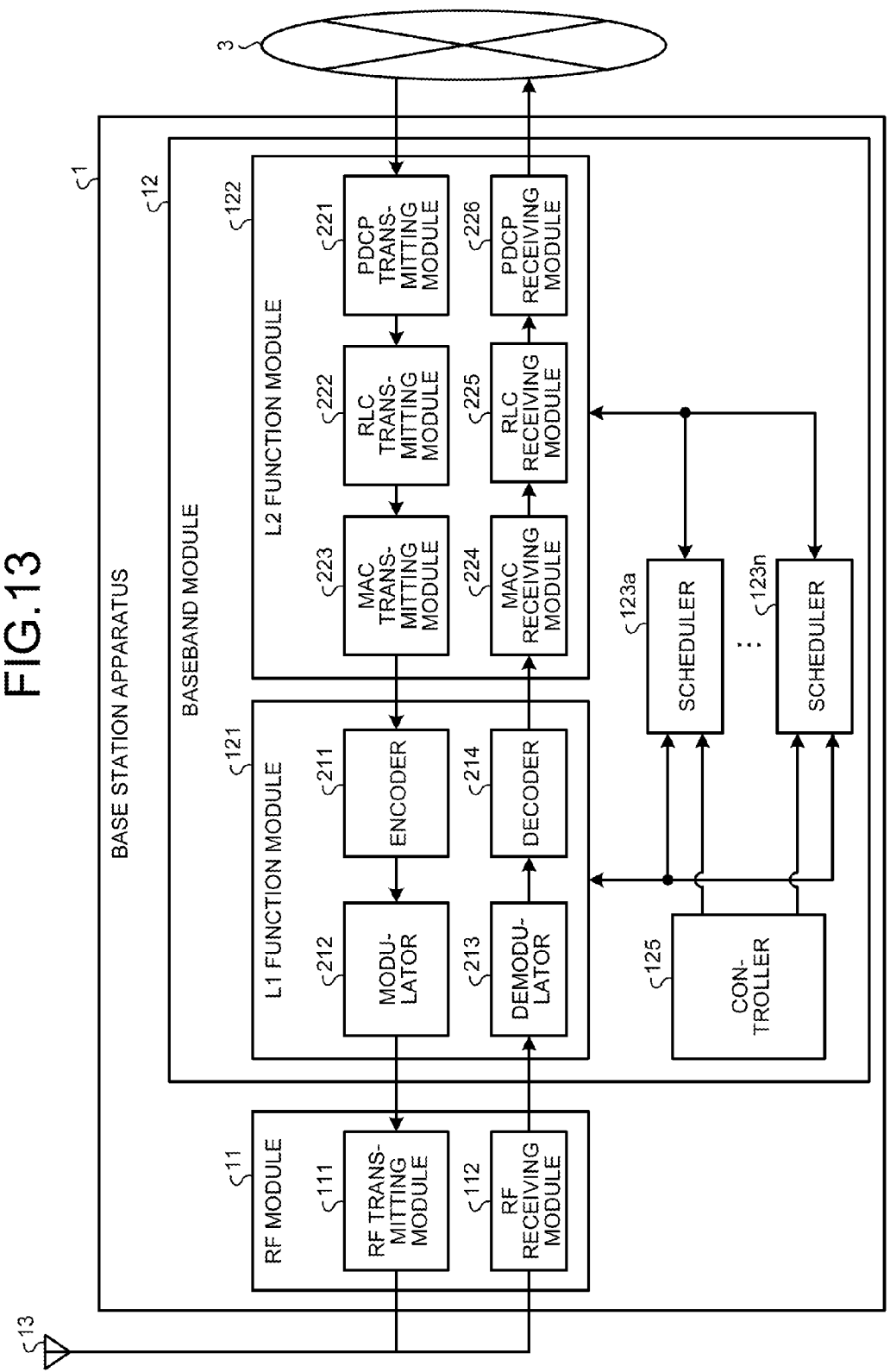
FIG. 13 is a block diagram of a base station apparatus according to a second embodiment.

A second embodiment will be described. A base station apparatus according to the second embodiment differs from that in the first embodiment in the method of dividing PDCCH resources used for the transmission of a PDCCH. FIG. 13 is a block diagram of the base station apparatus in the second embodiment. The base station apparatus 1 in the second embodiment is different from that of the first embodiment in that it includes n pieces of schedulers 123a to 123n. The n is varied by the number of groups created by the division of PDCCH resources as described later.

The schedulers 123a to 123n in the second embodiment have the same configuration as that illustrated in FIG. 3. In the following description, the explanations for the modules that have the same function as those in the first embodiment are omitted.

The aggregation level of division reference PDCCH resources here is defined as $L_0$. By using the following Expression 3, the division reference PDCCH resources are divided into the groups of $N_{grp}$ types in the following manner.

$$n_{grp} = m \bmod N_{grp} \quad (3)$$

The m represents the resource index of each of the division reference PDCCH resources.

Next, CCE index values corresponding to the division reference PDCCH resource are divided in accordance with the appropriate $n_{grp}$.

Figure 14:
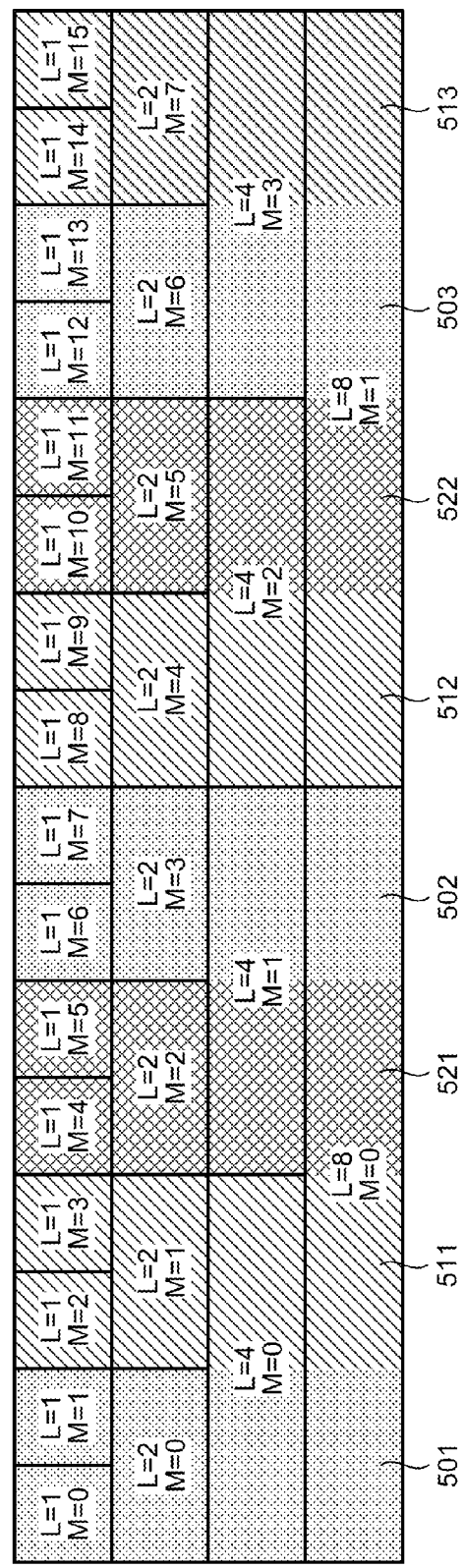
FIG. 14 is a diagram illustrating an example when the PDCCH resources of aggregation level two are divided by the number of groups $N_{grp}=3$.

For example, FIG. 14 illustrates an example when the PDCCH resources of aggregation level two are divided into the number of groups $N_{grp}$. FIG. 14 is a diagram illustrating an example when the PDCCH resources of aggregation level two are divided by the number of groups $N_{grp}=3$.

When the number of groups is defined as three, the number of schedulers also is three. That is, in this case, the base station apparatus 1 includes the schedulers 123a to 123c.

The areas 501, 502, and 503 in FIG. 14 belong to the same first group. The areas 511, 512, and 513 belong to the same second group. The areas 521 and 522 belong to the same third group.

In this case, the controller 125 permits the use of the respective groups to the schedulers 123a to 123c. For example, the controller 125 notifies the scheduler 123a of the transmission PDCCH resources corresponding to the first group as the use-permitted resources. The controller 125 further notifies the scheduler 123b of the transmission PDCCH resources corresponding to the second group as the use-permitted PDCCH resources. The controller 125 notifies the scheduler 123c of the transmission PDCCH resources corresponding to the third group as the use-permitted PDCCH resources.

The selecting module 232 of the scheduler 123a selects an allocation PDCCH resource out of the transmission PDCCH resources corresponding to the first group in the user-specific search area set by the area setting module 231.

The selecting module 232 of the scheduler 123b selects an allocation PDCCH resource out of the transmission PDCCH resources corresponding to the second group in the user-specific search area set by the area setting module 231.

The selecting module 232 of the scheduler 123c selects an allocation PDCCH resource out of the transmission PDCCH resources corresponding to the third group in the user-specific search area set by the area setting module 231.

However, the aggregation level $L_0$ of the division reference PDCCH resources, the number of groups $N_{grp}$, and the transmission PDCCH resources have the following relation.

Because the transmission PDCCH resources for which the aggregation level is greater than $L_0$ are to be divided by allocation, such transmission PDCCH resources are not allocable for the transmission of the PDCCH. That is, the transmission PDCCH resources for which the aggregation level is greater than $L_0$ are not usable for the transmission of the PDCCH.

When the product of $L_0$ and $N_{grp}$ ($L_0 \cdot N_{grp}$) is equal to or smaller than the product of a given aggregation level L and the number of search spaces $N_{ss}$ at the aggregation level ($L \cdot N_{ss}$), in other words, $L_0 \cdot N_{grp} \leq L \cdot N_{ss}$, the following condition is satisfied. That is, regarding the transmission PDCCH resources for which the aggregation level is L, the allocation of at least one transmission PDCCH resource is possible.

Furthermore, when $L_0 \cdot N_{grp}$ is a divisor of $L \cdot N_{ss}$, that is, $N \cdot L_0 \cdot N_{grp} = L \cdot N_{ss}$, regarding the transmission PDCCH resources for which the aggregation level is L, the number of transmission PDCCH resources among the groups is the same, resulting in equal division.

That is, when the aggregation level L of transmission PDCCH resources is equal to or smaller than $L_0$ and $L_0 \cdot N_{grp}$ is a divisor of $L \cdot N_{ss}$, the transmission PDCCH resources can be allocated to each scheduler equally. When an inequality occurs in the establishment of allocation among the schedulers, the bias in frequency of performable communication for each radio communication terminal device occurs. Consequently, it is preferable to perform the division that can equally allocate the PDCCH resources to each scheduler.

As explained in the foregoing, the radio base station apparatus in the second embodiment can divide PDCCH resources into groups of a variety of numbers. Consequently, the reliability and load distribution performance can be improved flexibly in accordance with the design of a radio communications system.

[c] Third Embodiment

A third embodiment will be described. A base station apparatus according to the third embodiment differs from those in the above-described embodiments in the method of determining use-permitted resources. The base station apparatus 1 and the scheduler 123 in the third embodiment are depicted in FIGS. 1 and 3, respectively. In the following description, the explanations for the modules that have the same function as those in the first embodiment are omitted.

The base station apparatus 1 in the third embodiment determines the use-permitted resources by using the groups created by dividing transmission PDCCH resources into a first half and a second half.

In this case, the controller 125 notifies the scheduler 123 of the transmission PDCCH resources in the first half of the group of PDCCH resources as the use-permitted resources, for example. The controller 125 further notifies the scheduler 124 of the transmission PDCCH resources in the second half of the group of PDCCH resources as the use-permitted PDCCH resources.

The selecting modules 232 of the schedulers 123 and 124 receive the information on the use-permitted resources from the controller 125. The selecting module 232 of the scheduler 123 then marks, as used, the usage status of the scheduler 123 in the second half of the group of PDCCH resources in the usage status table 250. The selecting module 232 of the scheduler 124 marks, as used, the usage status of the scheduler 124 in the first half of the group of PDCCH resources in the usage status table 250.

The selecting module 232 then refers to the usage status table 250 and selects an allocation PDCCH resource from the unused PDCCH resources in the user-specific search area that is acquired from the area setting module 231. Subsequently, the selecting module 232 notifies the L1 function module 121 of the information on the allocation PDCCH resource.

In this case, the schedulers 123 and 124 are not always able to find the transmission PDCCH resources available for allocation in the user-specific search area set by the area setting module 231. Thus, the situation of being unable to transmit the PDCCH is more likely to occur. Furthermore, depending on the method of setting user-specific search area, an inequality is likely to occur because the probability of detecting transmission PDCCH resources available for allocation is different between the scheduler 123 and the scheduler 124. However, when a method for which the probability of each search space to be used is equal is used as the method of setting a user-specific search area, the allocation of PDCCH resources between the scheduler 123 and the scheduler 124 is performed equally.

As explained in the foregoing, the base station apparatus in the third embodiment grouped a group of PDCCH resources into a first half and a second half. Consequently, even when the grouping is performed by a simple logic, the PDCCH resources can be divided, and thus the reliability and load distribution performance can be improved by multiplexing the baseband module.

[d] Fourth Embodiment

A fourth embodiment will be described. A base station apparatus according to the fourth embodiment differs from those in the above-described embodiments in the method of determining use-permitted resources. The base station apparatus 1 and the scheduler 123 in the fourth embodiment are depicted in FIGS. 1 and 3, respectively. In the following description, the explanations for the modules that have the same function as those in the first embodiment are omitted.

In the fourth embodiment, each scheduler is assigned with a scheduler number from zero in sequence. For example, the scheduler number for the scheduler 123 is defined as zero and the scheduler number for the scheduler 124 is defined as one.

The controller 125 notifies the schedulers 123 and 124 of the transmission PDCCH resources corresponding to the CCE index values that satisfy the following expression as the use-permitted resources.

Scheduler number={(first PDCCH index variable×aggregation level(*L*))+second PDCCH index variable} mod(total number of schedulers)

The first PDCCH index variable is a variable that assumes an integer value in the range of equal to or greater than 0 and equal to or smaller than floor($N_{CCE,k}$/L)−1. The floor function (floor) means a round-off calculation of a fractional portion (portion after the decimal point). The second PDCCH index variable is a variable that assumes an integer value in the range of equal to or greater than 0 and equal to or smaller than M(L)−1. The M(L) represents the number of PDCCH resources that are present in a user-specific search area at a given aggregation level L. The $N_{CCE,k}$ is the number of CCEs allocable to PDCCH in the sub-frame.

Now, it is assumed that the $N_{CCE,k}$ is 32, the aggregation level is four, the scheduler number is zero, and the total number of schedulers is three. Defining the first PDCCH index variable as m1 and the second PDCCH index variable as m2, the above expression is satisfied when (m1, m2) are {(0, 0), (1, 0), (2, 0), (3, 0), (4, 0), (5, 0), (6, 0), (7, 0)}. The relation of the CCE index value with the first PDCCH index variable (m1) and the second PDCCH index variable (m2) is defined by the following expression.

CCE index value=(first PDCCH index variable (*m*1)×aggregation level (*L*))+second PDCCH index variable (*m*2)

In this case, the controller 125 obtains the CCE index values (0, 4, 8, 12, 16, 20, 24, 28) corresponding to the (m1, m2) being {(0, 0), (1, 0), (2, 0), (3, 0), (4, 0), (5, 0), (6, 0), (7, 0)}, respectively. The controller 125 defines a group of CCE resources in which the obtained CCE index values are brought together, as the allocation target of the scheduler 123. The controller 125 then notifies the scheduler 123 of the group of CCE resources as the use-permitted resources.

The controller 125 obtains the PDCCH resources that are permitted to use for the other schedulers in the same manner, and notifies the other schedulers of the PDCCH resources.

As explained in the foregoing, even when the grouping as described in the fourth embodiment is used, the groups that divide the transmission PDCCH resources can be generated. Thus, the grouping of transmission PDCCH resources can be performed in a variety of ways. By performing the grouping, the schedulers can be divided, and thus the reliability and load distribution performance can be improved by multiplexing the baseband module.

A radio communications system, a radio base station apparatus, and a method for controlling a radio communications system according to one aspect of the embodiments disclosed in the application have an advantageous effect in that the reliability and the load distribution performance can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communications system comprising:
   a radio base station; and
   a plurality of radio communication terminal devices,
   the radio base station comprising:
      a first memory; and
      at least one first processor coupled to the first memory which includes one or more following modules, when executed by the at least one first processor is configured to implement
      an area setting module that sets a part of an area of resources used for communication with the radio communication terminal devices as a search area,
      a plurality of schedulers that each select a resource included in the search area and belonging to a group allocated to each of the schedulers out of groups that are divided based on logical positions of resources, and
      a transmitting module that transmits a signal including control information by using the resource selected by each of the schedulers,
   the radio communication terminal devices each comprising:
      a second memory; and
      a second processor coupled to the second memory, which when executing is configured to implement
      an acquiring module that receives the signal, search the search area in the received signal, and acquire control information addressed to the corresponding radio communication terminal device, and
      a communication module that performs communication with the radio base station based on the control information acquired by the acquiring module, wherein
   the resources used for communication include a plurality of types of resources having different sizes,
   the area setting module determines a size of transmission resources used for the communication with the radio communication terminal devices and sets a part of an area of the transmission resources as a search area, and
   each of the schedulers selects a transmission resource included in the search area and corresponding to a reference resource belonging to a group allocated to each of the schedulers out of groups created by dividing, based on the logical positions, division reference resources having a specific size out of the resources.

2. The radio communications system according to claim 1, wherein
   the schedulers include a first scheduler and a second scheduler,
   the first scheduler is allocated with a group of PDCCH resources for which resource indices are zero and even numbers out of the PDCCH resources that are the division reference resources for which an aggregation level is four, and the second scheduler is allocated with a group of PDCCH resources for which the resource indices are odd numbers out of the PDCCH resources that are the division reference resources for which the aggregation level is four.

3. The radio communications system according to claim 2, wherein
the radio communication terminal devices are divided to correspond to a first group and a second group,
the first scheduler allocates resources to the radio communication terminal devices corresponding to the first group, and
the second scheduler allocates resources to the radio communication terminal devices corresponding to the second group.

4. The radio communications system according to claim 1, wherein
the area setting module determines the part of the area by using a random number, and
the acquiring module identifies the part of the area by using the random number and performs search.

5. A method for controlling a radio communications system that comprises a radio base station apparatus and a plurality of radio communication terminal devices, the method comprising:
setting, by the radio base station apparatus, a part of an area of resources used for communication with the radio communication terminal devices as a search area;
selecting, by each of a plurality of schedulers included in the radio base station apparatus, a resource included in the search area and belonging to a group allocated to each of the schedulers out of groups that are divided based on logical positions of resources;
transmitting, by the radio base station apparatus, a signal including control information by using the resource selected by each of the schedulers; and
causing each of the radio communication terminal devices to receive the signal transmitted from the radio base station apparatus, search the search area in the received signal so as to acquire control information addressed to the corresponding radio communication terminal device, and perform communication with the radio base station apparatus based on the acquired control information, wherein
the resources used for communication include a plurality of types of resources having different sizes,
the setting determines a size of transmission resources used for the communication with the radio communication terminal devices and sets a part of an area of the transmission resources as a search area, and
each of the schedulers selects a transmission resource included in the search area and corresponding to a reference resource belonging to a group allocated to each of the schedulers out of groups created by dividing, based on the logical positions, division reference resources having a specific size out of the resources.

* * * * *